United States Patent
Al-Omani

(10) Patent No.: US 9,161,518 B2
(45) Date of Patent: Oct. 20, 2015

(54) GRAVITY FEED DISPENSING SYSTEM FOR POULTRY AND OTHER SMALL ANIMALS

(71) Applicant: Jasem Mohammad Ali Rashed Al-Omani, Safat (KW)

(72) Inventor: Jasem Mohammad Ali Rashed Al-Omani, Safat (KW)

( * ) Notice: Subject to any disclaimer, the term of this patent is extended or adjusted under 35 U.S.C. 154(b) by 100 days.

(21) Appl. No.: 14/220,254

(22) Filed: Mar. 20, 2014

(65) Prior Publication Data

US 2015/0264895 A1  Sep. 24, 2015

(51) Int. Cl.
*A01K 5/00* (2006.01)
*A01K 39/012* (2006.01)
*A01K 31/00* (2006.01)
*A01K 5/02* (2006.01)

(52) U.S. Cl.
CPC ............... *A01K 39/012* (2013.01); *A01K 31/00* (2013.01); *A01K 5/0225* (2013.01)

(58) Field of Classification Search
CPC .................................................... A01K 5/0225
USPC .......... 119/51.01, 51.5, 52.1, 53, 57.1, 57.91, 119/57.92, 61.2
See application file for complete search history.

(56) References Cited

U.S. PATENT DOCUMENTS

| | | | |
|---|---|---|---|
| 3,502,053 A | 3/1970 | Geerlings | |
| 4,241,700 A | 12/1980 | Cobb | |
| 4,348,988 A | 9/1982 | Lawson | |
| 4,495,894 A | 1/1985 | Swartzendruber | |
| RE33,456 E | 11/1990 | Van Rooijen | |
| 6,868,801 B2 * | 3/2005 | Rovira Badia et al. | ...... 119/51.5 |

* cited by examiner

*Primary Examiner* — Yvonne Abbott-Lewis
(74) *Attorney, Agent, or Firm* — Hauptman Ham, LLP

(57) ABSTRACT

A gravity feed dispensing system for small animals in multi-level cages includes a rectangular hopper for containing a supply of animal feed and a number of multi-level cages. The system also includes a number of pipes with one pipe for each cage. The pipes are gathered together to form a pipe rack of upwardly facing open ends forming a planar array below the hopper. A first chute connects the hopper to the pipe rack for delivering food to the cages. A control plate having a small central opening is disposed in the chute between the hopper and the pipe racks. In addition, a pair of sliding gates is disposed between the control plate and the pipe rack together with a mechanism for opening and closing the pair of gates. The system also includes a mechanism for adjusting the vertical distance between the control plate and the pair of gates.

7 Claims, 4 Drawing Sheets

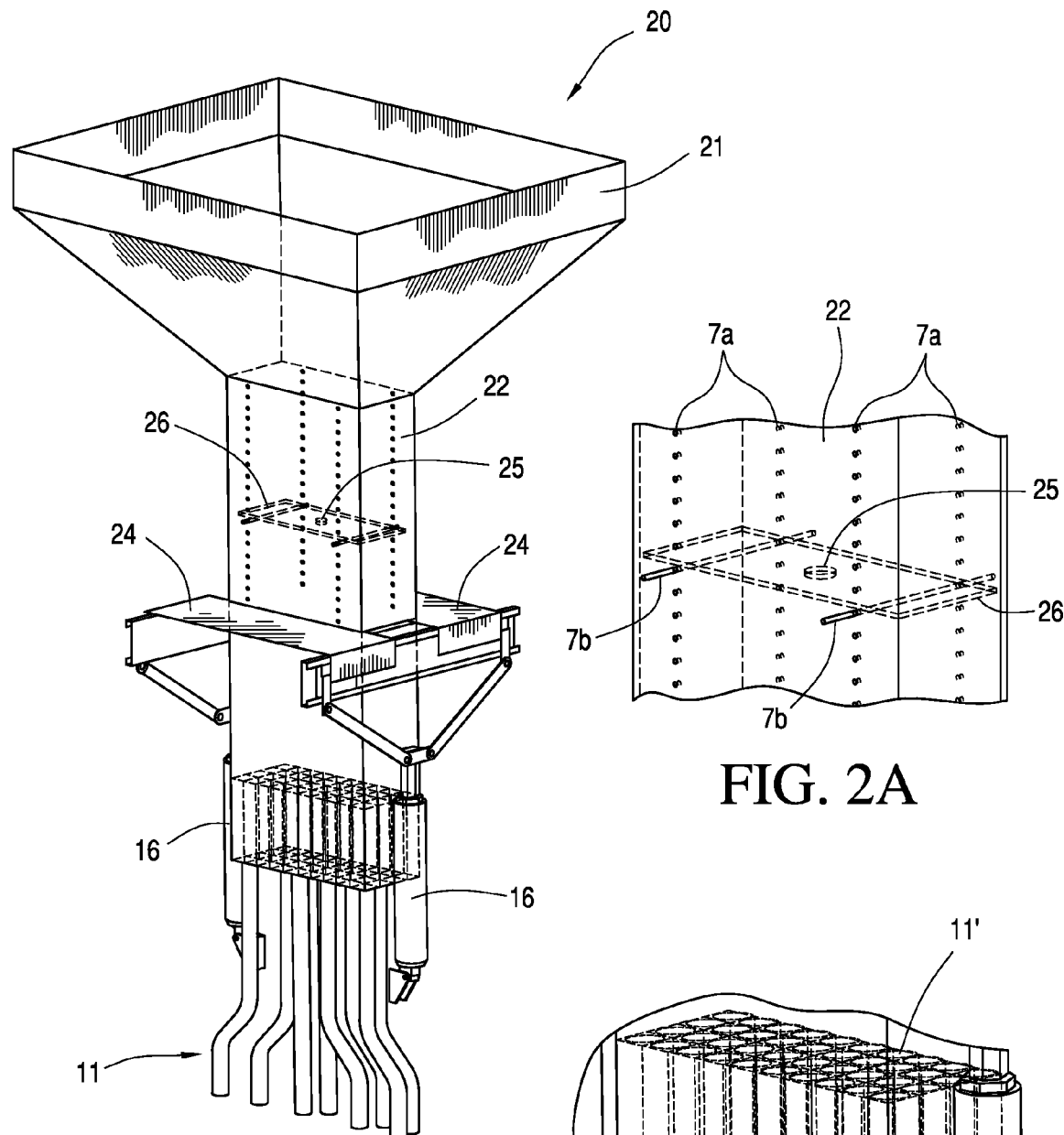
FIG. 2A
FIG. 2
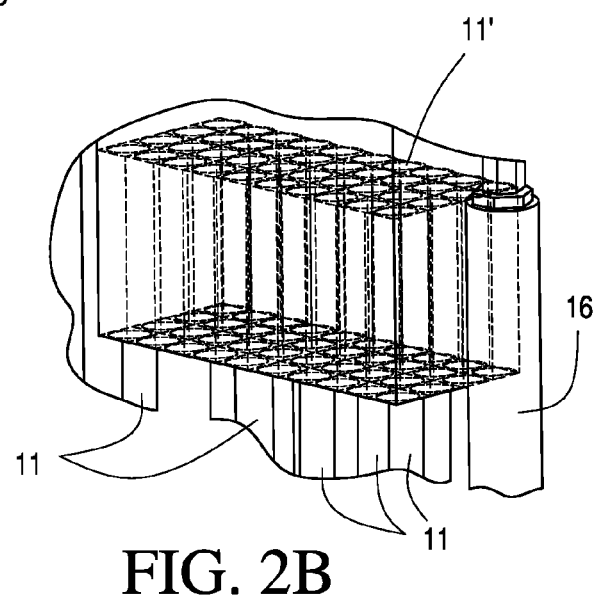
FIG. 2B

GRAVITY FEED DISPENSING SYSTEM FOR POULTRY AND OTHER SMALL ANIMALS

FIELD OF THE INVENTION

This invention relates to a gravity feed dispensing system for poultry and other small animals and more particularly to a system for delivering a preselected amount of feed to individual cages each of which contains an individual animal.

BACKGROUND FOR THE INVENTION

Feed dispensing systems are well known and have been used for a number of years. Such systems typically include an auger for conveying feed along a row of cages in essentially equal amounts. For example, a U.S. Pat. No. 4,241,700 of Richard H. Cobb discloses an apparatus for dispensing feed to a closed-loop trough for simultaneous distribution of the feed to selectively positioned feed stations. As disclosed a conveyor in the trough is used for displacing the feed from the storage hopper along the length of the trough to openings over the feed stations which are maintained covered by suitable means such as a sliding cutoff until feed is distributed uniformly throughout the trough. The openings are then uncovered in concert to simultaneously distribute feed from the trough to the feed stations.

A more recent U.S. Pat. No. 4,495,894 of Ray E. Swartzendruber discloses a feed distribution apparatus that includes a conveyor system for delivering feed to poultry cages. The cages are organized in an oppositely facing, multi-level array. The system comprises a first endless conduit extending along an upper conduit run past an upper level of cages facing in a first direction, and extending along a lower conduit run past a lower level of cages facing in a second or opposite direction. A second endless conduit extends along an upper conduit run past an upper level of cages facing in that opposite direction, and extends along a lower conduit run past the lower level of cages facing in the first direction. Displaceable driver elements disposed in these endless conduits carry feed in trough runs past the adjacent cages. An overhead delivery conveyor delivers feed to tubes and permits the level of feed fed in the conduits to be adjusted.

Finally, a U.S. Pat. No. Re. 33,456 of Gerardus J. Van Rooijen is directed to a Rotating Helical Conveyor System. The system delivers feed to a plurality of animal cages arranged in rows and has an endless conduit extending along a conduit run past at least one of the rows of cages and through a feed trough disposed adjacent the faces of the row of cages. An elongate, continuous, endless material moving element extends through the endless conduit run and is longitudinally movable therethrough, and a driver element advances the endless material moving element along and through the conduit run. The material moving element comprises an elongate helical member defining a longitudinal helix axis and bendable about this axis for following the endless conduit run. Cooperating structure on the driver element and on the helical member rotates the helical member about the helix axis thereof while simultaneously axially advancing the helical member along and through the conduit run.

Notwithstanding the above, it is presently believed that there is a need and a potential commercial market for a gravity feed dispensing system in accordance with the present invention. There should be a need because such gravity feed systems provide routine servings of feed to poultry, pigeons, birds and other small animals.

BRIEF SUMMARY OF THE INVENTION

In essence the present invention contemplates a gravity feed dispensing system for feeding poultry, pigeons, birds and other small animals disposed in multilevel cages. The feed dispensing system comprises or consists of the following elements.

A hopper for containing a supply of animal feed and a plurality of multi-level cages disposed below the hopper for containing a plurality of small animals as for example with one animal in each cage.

The system also includes a plurality of pipes with a plurality of upwardly facing open ends adjacent one another in a generally horizontal planar array to form a pipe rack disposed below the hopper between the hopper and the cages.

A first chute connects the hopper to the planar array of the open ends of the pipe rack, and wherein each of the pipes includes a second end for delivering feed to one of the cages.

An important feature of the present invention relates to a pair of sliding gates disposed in the first chute above the open end of the pipe rack for opening and closing said first chute and providing a measured flow of feed to individual cages as well as a mechanism for opening and closing the gates.

A control plate having a relatively small opening of preselected size disposed at a preselected vertical distance above said sliding gates. The small size opening typically ranges from about ¼ to 1 inch diameter for about 60 cages.

Means for adjusting (changing) the vertical distances between the control plate and said sliding gate members is also provided and may typically range from about 3 to 16 inches.

In addition, the above system in accordance with the invention includes means as for example a series of vertically spaced openings and horizontally disposed pins for changing or adjusting the vertical distance between the control plate and the sliding gate members.

The invention will now be described in connection with the accompanying drawings wherein like reference numerals are used to identify like parts.

DESCRIPTION OF THE DRAWINGS

FIG. 2 is a further illustration of the gravity feed dispensing system illustrated in FIG. 1 that shows the relative positions of the control plate and sliding gates;

FIG. 2A is a schematic illustration of a control plate including supporting pins and openings in the side of an upper chute for adjusting the distance between the control plate and the sliding gates;

FIG. 2B is a schematic illustration of a pipe rack as used in a first embodiment of the invention;

DETAILED DESCRIPTION OF THE PREFERRED EMBODIMENTS OF THE INVENTION

Figures 1, 1A:
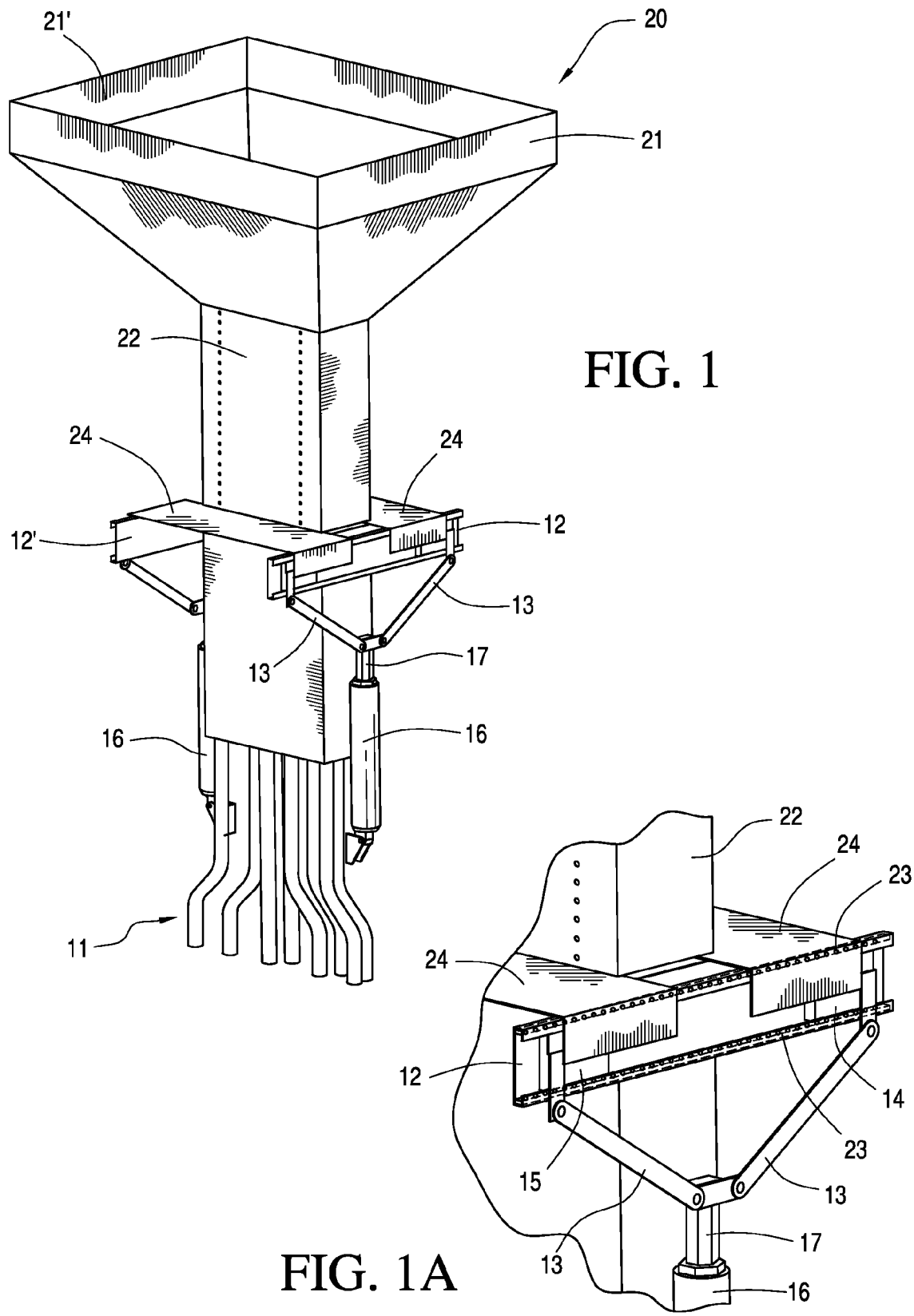
FIG. 1 is a perspective view of the gravity feed dispensing system in accordance with a first embodiment of the invention.
FIG. 1A illustrates a portion of the feed dispensing system shown in FIG. 1 that includes a pair of sliding gates and mechanism for opening and closing the sliding gates.
Figure 3:
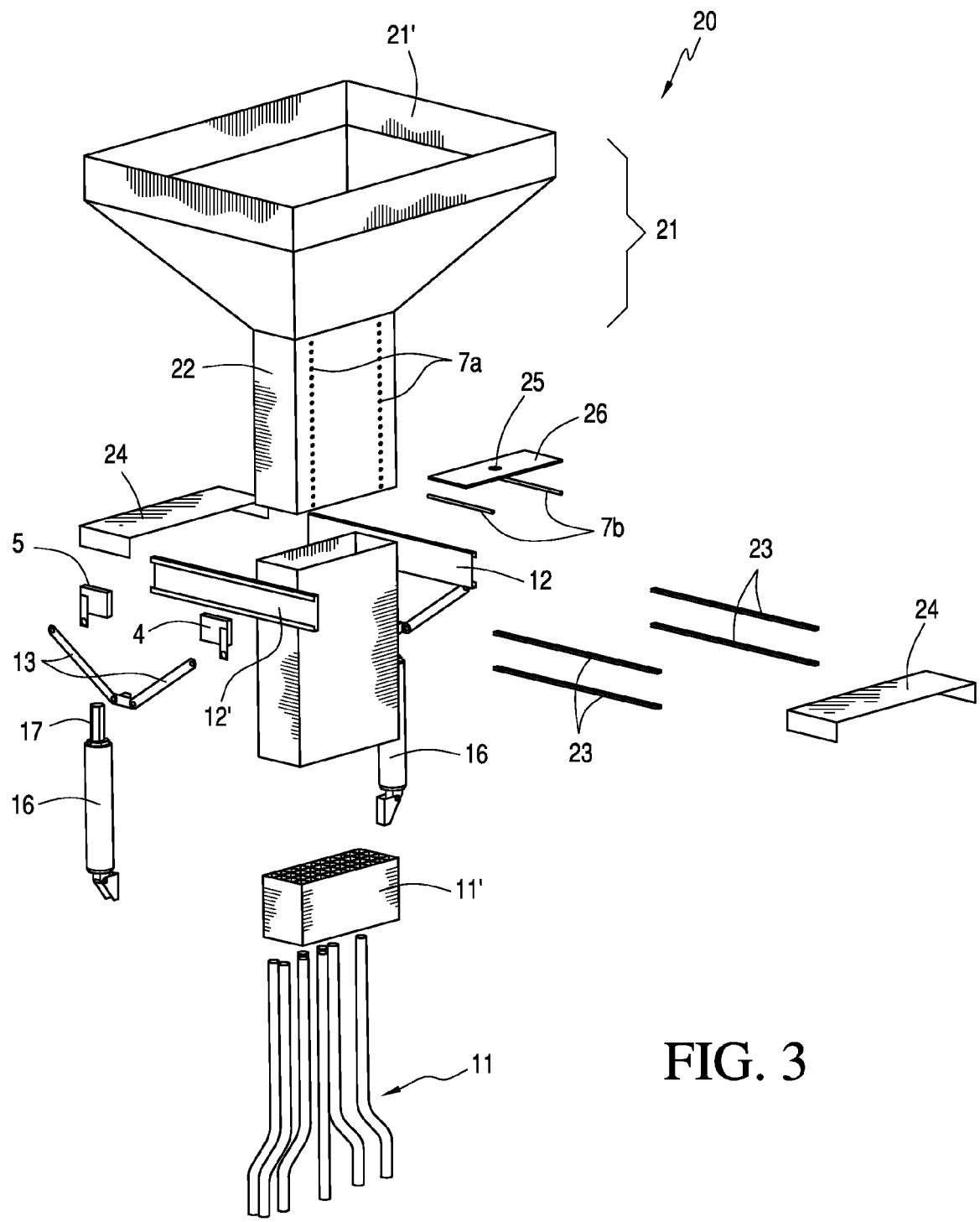
FIG. 3 is an exploded view of the gravity feed dispensing system illustrated in the aforementioned figures.

As illustrated in FIGS. 1 and 3 a gravity feed dispensing system 20 for feeding poultry, pigeons, birds and other small animals includes a generally rectangular hopper 21 having an open top surrounded by four vertical walls 21'. The vertical walls are adjacent four truncated walls in the shape of a truncated inverted pyramid. Other shapes of hoppers may also be used as for example a circular funnel shape plus a plate to cover or close the openings between circular pipes in a pipe rack.

Figure 4:
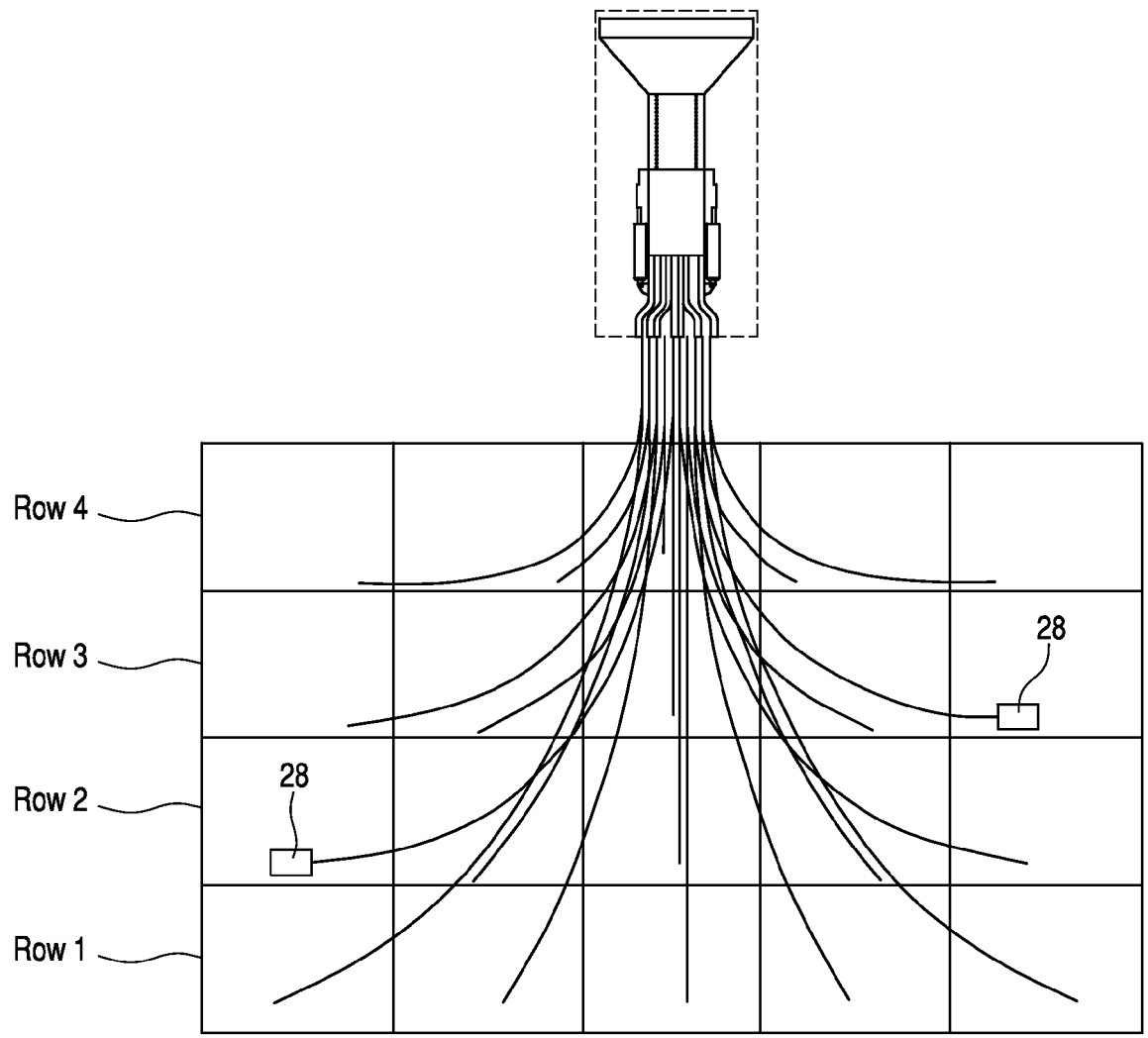
FIG. 4 is a schematic illustration of the gravity feed dispensing system for multi-level cages.

The system 20 also includes a first chute 22 having a rectangular cross section for connecting the hopper 21 to a pair of sliding gates 24 for opening and closing off a flow of animal feed. A control plate 26 as shown in FIGS. 2, 2A and more clearly in FIG. 3 is disposed at a preselected vertical distance above the gates 24 and defines a relatively small opening 25 (FIGS. 2, 2A and 3) in a central portion thereof to control the flow of feed to each of cages 28 (as shown in FIG. 4). The opening 25 typically ranges from about ½ inch to ¾ inch in diameter.

The pair of gates 24 are shown more clearly in FIG. 1A and include a pair of guide members 12 that are disposed on opposite sides of the chute 22.

As illustrated more clearly in FIGS. 1, 1A and 3, the sliding gates 24 are supported by or rest upon the guide member 12 and extend across the chute 22 perpendicular to the guide members 12. The sliding gates 24 each rest upon two sets of ball bearings 23 that provide near frictionless movement toward and away from one another to close or open the gates 24 for a flow of animal feed to each of the animal cages 28 (FIG. 4).

Each of the gates 24 with one of the gates 24 connected to sliding blocks 14 and 15 respectively on opposite sides of the chute 22 are movable across the chute 22 to open or close off the flow of animal feed to each of the cages 28. As shown more clearly in FIG. 1A a pair of solenoids 16 is disposed on each sides of the chute 22 adjacent a lower portion 19 of the chute 22 below the guide members 12 and connected to the sliding blocks 14 and 15 by the links 13 and to the linearly movable element 17 of the solenoid 16. Thus, the extension of the linear movable element 17 will move the gates away from one another to allow the animal feed to reach the cages 28 or when the linearly movable element 17 is withdrawn i.e., moves in an opposite direction closes the sliding gates 24 together. Two pair of links 13 connects the sliding blocks 14 to the linearly moveable element 17 and the solenoid 16.

The sliding gates 24 are supported by or rest upon the horizontal guide members 12 and extend across the chute 22 perpendicular to the guide members 12. The sliding gates 24 each rest upon two sets of ball bearings 23 to provide near frictionless movement along guide members 12, 12' toward one another or away from one another to close or open the gates 24. Opening the gates 24 allows the feed to flow through the pipes 11 to individual cages.

A key element in the gravity feed distribution system resides in the vertical movement of control plate 26 as illustrated in FIGS. 2 and 2A. As shown in FIG. 2A the chute 22 includes a plurality of vertically disposed sets of small openings 7A that are sized to receive one or more pins 7B to fit therein or extend therethrough with a relatively snug fit. As shown, there are four small openings with two horizontally spaced openings on a first side of chute 22 and two horizontally spaced openings on an opposite side. The control plate is then supported on two pins each of which extend across the chute 22 as shown in FIG. 2A.

FIG. 2B illustrates a pipe rack 11' as used in the invention and wherein the pipe rack 11' includes a plurality of open ended rectangular or square shaped pipes 11 forming a horizontal array of open ends below a pair of sliding gates. Each of these open ends receive about equal amounts of animal feed with one for each of the plurality of cages.

In the use of the gravity feed distribution system in accordance with the invention the vertical height is selected to provide a uniform flow of generally equal amounts of feed to each cage. For example, the system or device for feeding poultry or other small animals includes four main parts, namely a hopper 21, a control plate 26, a pair of sliding gates 24 and a pipe rack 11'. The feed is placed in the hopper and flows down onto the control plate 26 and through the small opening 25 and onto the open faces of the pipe rack 11'. The flow of food through the opening 26 provides approximately equal amounts of feed to each cage 28.

The sliding gates 24 are opened and closed by an electric actuator as for example two solenoids 16 with one solenoid on each side of the chute 22. When activated a linear extending member opens the gates 24 by pushing the gates 24 apart into an open position. Then when the linear extending member is withdrawn into the solenoid, the gates are drawn together to close of the flow of feed. As shown, a pair of links 13 are connected at one end to the solenoid 16 and at an opposite end to one of the sliding blocks.

The control plate 17 is an important part of the invention. It has three functions:
1) To control the amount of feed ready for delivery when the gates 24 are opened. This is achieved by controlling the distance between the gates 24 and the control plate 26 by changing the location of the pins 7B which are inserted in the opening 7A.
2) The control plate 26 reduces the pressure caused by the feed on the gates 24; and
3) In case of unintentionally increased opening time of the gates 24, they reduce the amount of food falling from the hopper down to the pipe rack 11' because the feed is only allowed to pass through a small opening 25 in the control plate 26.

While the invention has been described in connection with the above-identified preferred embodiments, it should be recognized and understood that changes and modifications may be made therein without departing from the scope of the appended claims.

What is claimed is:

1. A gravity feed dispensing system for feeding poultry, pigeons, birds and other small animals disposed in multi-level cages, said system comprising:
    a hopper for containing a supply of animal feed and a plurality of multi-level cages disposed below said hopper for containing a plurality animals;
    a plurality of pipes gathered together into a pipe rack with a plurality of upwardly facing open ends of said pipes adjacent one another in a generally horizontal planar array disposed below said hopper;
    a first chute connecting said hopper and said open ends of said pipe rack; and
    wherein each of said plurality of pipes includes a second end connected to one of said cages;
    a pair of sliding gates disposed in said first chute above said pipe rack for opening and closing said first chute and providing a flow of feed to said cages and a mechanism for opening and closing said sliding gates;
    a control plate having a relatively small opening of preselected size disposed at a preselected distance above said sliding gates and below said hopper; and
    means for changing the vertical distances between said control plate and said sliding gate members.

2. The gravity feed dispensing system for feeding poultry, pigeons, birds and other small animals disposed in multi-level cages according to claim 1, in which said hopper and said first chute have a rectangular cross section.

3. The gravity feed dispensing system for feeding poultry, pigeons, birds and other small animals disposed in multi-level cages according to claim 2, in which said pipe rack and each of said pipes have a rectangular cross section and wherein there are no spaces between said open ends of said pipes.

4. The gravity feed dispensing system for feeding poultry, pigeons, birds and other small animals disposed in multi-level cages according to claim 2, in which said means for changing the vertical distance between said control plate and said sliding gates includes a pair of pins and a corresponding pair of openings in said first chute to receive said pins therein.

5. The gravity feed dispensing system for feeding poultry, pigeons, birds and other small animals disposed in multi-level cages according to claim 4, which includes a mechanism for closing a pair of sliding gates and wherein said mechanism includes a pair of solenoids and two pairs of connecting links.

6. A gravity feed dispensing system for feeding poultry, pigeons, birds and other small animals disposed in multi-level cages, said system consisting of:
- a rectangular hopper for containing a supply of animal feed and a plurality of multi-level cages disposed below said hopper for containing a plurality of animals with one animal in each cage;
- a pipe rack including a plurality of pipes each of which has a rectangular cross section gathered together with a plurality of upwardly facing open ends of said pipes adjacent one another in a generally horizontal planar array disposed below said hopper;
- a first chute connecting said hopper and said open ends of said pipe rack; and
- wherein each of said plurality of pipes including a second end connected to one of said cages;
- a pair of sliding gates disposed in said first chute above said pipe rack for opening and closing said first chute and providing a flow of feed to said cages and a mechanism for opening and closing said sliding gates;
- a control plate having a relatively small opening of preselected size disposed at a preselected distance above said sliding gates and below said hopper; and
- means for changing the vertical distances between said control plate and said sliding gate members.

7. A gravity feed dispensing system for feeding poultry, pigeons, birds and other small animals according to claim 6, in which said mechanism consists of a pair of solenoids with one solenoid on each side of said first chute and wherein each of said solenoids includes a coiled metal wire and a solid metal core surrounded by said coil of wire and said solid metal core has an upwardly extending extension, a pair of upwardly connecting links connected at one end thereof to said upwardly extending extension and an opposite end connected to one of said sliding gate members wherein extension of said core upwardly due to electricity flowing through said wire coil moves said sliding gates into an open position and reverse movement moves said gates into a closed position.

* * * * *